United States Patent
Shepard

(10) Patent No.: US 9,978,178 B1
(45) Date of Patent: May 22, 2018

(54) HAND-BASED INTERACTION IN VIRTUALLY SHARED WORKSPACES

(71) Applicant: Rawles LLC, Wilmington, DE (US)

(72) Inventor: Deborah May Shepard, Portola Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 13/660,832

(22) Filed: Oct. 25, 2012

(51) Int. Cl.
| G09G 5/00 | (2006.01) |
| G06F 3/00 | (2006.01) |
| G06T 19/00 | (2011.01) |

(52) U.S. Cl.
CPC ............ G06T 19/00 (2013.01); *G06T 19/006* (2013.01)

(58) Field of Classification Search
CPC .................................................. G06C 30/0643
See application file for complete search history.

(56) References Cited

U.S. PATENT DOCUMENTS

| 4,988,981 | A | * | 1/1991 | Zimmerman et al. | ........ 345/158 |
| 5,594,469 | A | * | 1/1997 | Freeman et al. | ............. 345/158 |
| 5,905,487 | A | * | 5/1999 | Kwon | ........................... 345/158 |
| 6,043,805 | A | * | 3/2000 | Hsieh | ............................. 345/158 |
| 6,545,663 | B1 | * | 4/2003 | Arbter et al. | ................... 345/158 |
| 6,611,242 | B1 | * | 8/2003 | Hongo et al. | .................. 345/2.1 |
| 6,967,566 | B2 | * | 11/2005 | Weston et al. | ............ 340/323 R |
| 7,356,563 | B1 | * | 4/2008 | Leichtling et al. | ........... 709/204 |
| 7,418,392 | B1 | | 8/2008 | Mozer et al. | |
| 7,720,683 | B1 | | 5/2010 | Vermeulen et al. | |
| 7,774,204 | B2 | | 8/2010 | Mozer et al. | |
| 8,287,373 | B2 | * | 10/2012 | Marks et al. | ................... 463/36 |
| 8,589,824 | B2 | * | 11/2013 | Hillis et al. | ................... 715/863 |
| 8,698,873 | B2 | * | 4/2014 | Barrus | ....................... 348/14.08 |
| 8,702,515 | B2 | * | 4/2014 | Weston et al. | .................. 463/39 |
| 8,743,089 | B2 | * | 6/2014 | Sato | ....................... G06F 3/017 345/158 |
| 8,762,862 | B2 | * | 6/2014 | Singh et al. | ................... 715/758 |
| 8,773,462 | B2 | * | 7/2014 | Kasuya et al. | ................ 345/629 |
| 2009/0193675 | A1 | * | 8/2009 | Sieber | ............................. 33/759 |
| 2009/0297052 | A1 | * | 12/2009 | Xu | ..................... G06K 9/00711 382/236 |
| 2010/0295921 | A1 | * | 11/2010 | Guthrie et al. | ............ 348/14.08 |
| 2011/0210908 | A1 | * | 9/2011 | Kasuya et al. | ................ 345/2.2 |
| 2012/0117514 | A1 | * | 5/2012 | Kim et al. | ..................... 715/849 |
| 2012/0223885 | A1 | | 9/2012 | Perez | |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Ryan R Yang
(74) *Attorney, Agent, or Firm* — Lee & Hayes, PLLC

(57) ABSTRACT

When sharing visible content on multiple display surfaces associated with different users, the hand of a user may be detected and analyzed when placed over the user's display surface. Characteristics of the user's hand, including things such as position, orientation, color, shape, and texture, may be shared with other users. Based on these characteristics, a representation of the user's hand may be depicted over the shared content on the display surfaces of the other users.

23 Claims, 3 Drawing Sheets

(56) References Cited

U.S. PATENT DOCUMENTS

| | | | |
|---|---|---|---|
| 2012/0233553 A1* | 9/2012 | Barrus | G06Q 10/10 715/751 |
| 2013/0002532 A1* | 1/2013 | Raffle et al. | 345/156 |
| 2013/0127892 A1* | 5/2013 | Moore | G06T 11/001 345/582 |
| 2013/0257748 A1* | 10/2013 | Ambrus | G02B 27/0093 345/173 |

* cited by examiner

HAND-BASED INTERACTION IN VIRTUALLY SHARED WORKSPACES

BACKGROUND

Widespread availability and adoption of wide-area networking technologies have made it possible for users who are in different locations to collaborate using shared resources. A common technique for collaboration involves sharing common visual content between the computers of multiple users. For instance, a document or other presentation may be displayed simultaneously on the computer displays of the multiple users. Audio and/or video conferencing may be used in conjunction with this type of collaboration so that the users may discuss aspects of the displayed content.

In many cases, the users can interact by editing or otherwise manipulating the displayed document as it is displayed. Such user activity is typically visible in real time to the other participating users. In addition, one or more users may move a cursor or other pointer relative to the shared content, and the cursor is visible to all participants.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described below are systems and techniques for multi-user collaboration with respect to shared visible content. For example, a document may be shared between multiple users, and displayed concurrently on display surfaces associated with the users. A first user may at times point at parts of the shared content using their hand or using a handheld object such as a pen. This user activity is detected, and information regarding the positioning and other characteristics of the user hand are shared with other users. Based on this information, a virtual hand is created and displayed on the display surfaces of the other users. The virtual hand is a likeness or image of a hand, which may in some embodiment have characteristics similar to those of the hand of the first user. The virtual hand is displayed on the display surfaces of the other users at a position corresponding to the position of the first user's hand relative to the shared content.

Figure 1:
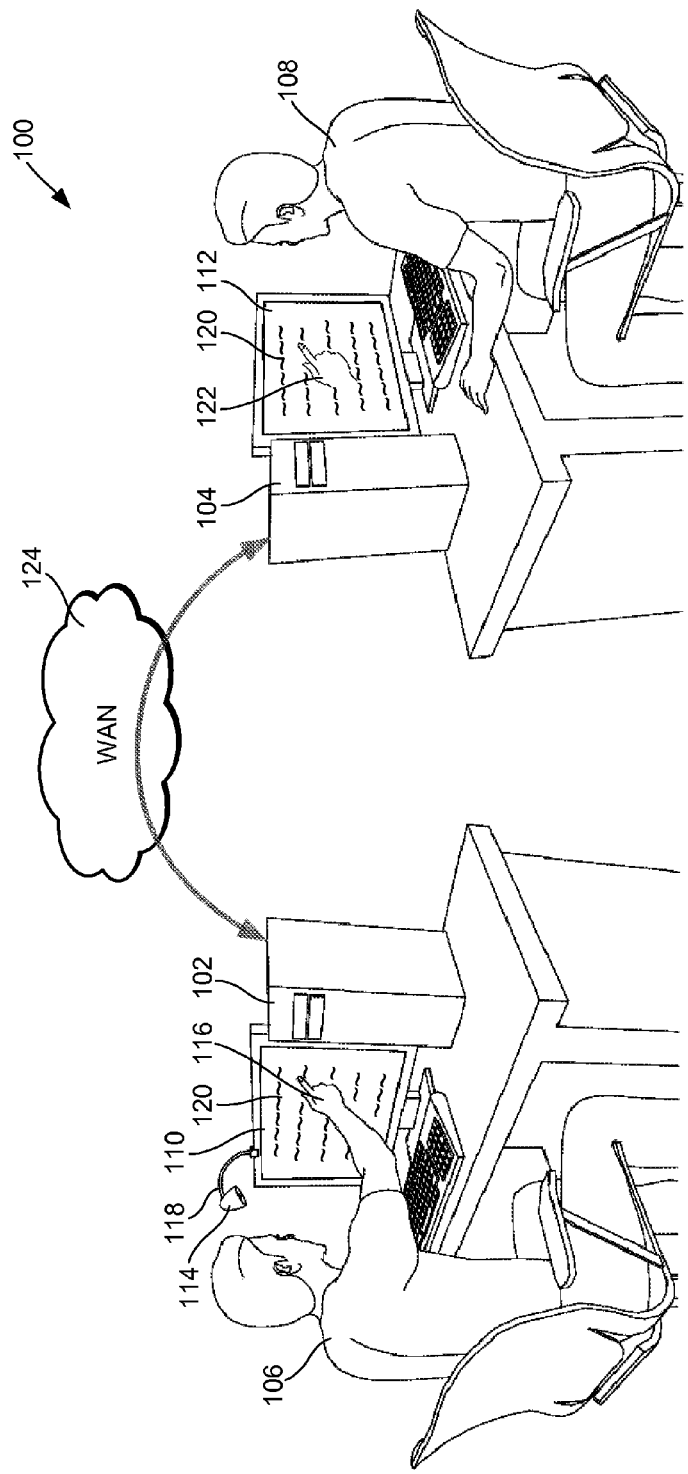
FIG. 1 illustrates an environment in which users may collaborate with respect to shared content that is displayed on display surfaces associated with the respective users.

FIG. 1 shows an example environment 100 in which the described techniques may be implemented. The environment 100 includes first and second computing devices 102 and 104, also referred to herein as local and remote computing devices or computers 102 and 104. The first computing device 102 is associated with a first or local user 106. The second computing device 104 is associated with a second or remote user 108.

The computing devices 102 and 104 may comprise any of various types of devices, including desktop computers, portable computers, personal media devices, communications devices, and so forth. Each computing device has a user display or display surface: the first computing device 102 has a first display surface 110 and the second computing device 104 has a second display surface 112. For purposes of discussion, the display surface 110 may be referred to as a local display surface, and the display surface 112 may be referred to as a remote display surface.

Although FIG. 1 shows only two computing devices, the techniques described below may be used with any number of users and computing devices that are configured to share content.

The local computing device 102 has or is associated with an imaging device 114 that is positioned and configured to image a hand 116 of the user 106 when the user hand 116 is placed over the display surface 110 of the computing device 102. The imaging device 114 may comprise an optical camera that captures two-dimensional optical images of a region containing the display surface 110, including color information regarding the user hand 116. Alternatively, the imaging device 114 may comprise a depth sensor that captures three-dimensional images or depth maps of a region containing the display surface 110, such as an infrared ranging device or other depth sensing device. In some embodiments, the imaging device 114 may capture and provide both two-dimensional color or greyscale images as well as three-dimensional depth information.

In the illustrated example, a mounting arm 118 extends from the display surface 110 or from a housing or bezel of the display surface 110 to support the imaging device 114. The imaging device 114 is positioned in front of and facing the display surface 110 so that the entire display surface 110 is within the field of view of the imaging device 114.

The imaging device 114 is configured to communicate with operating logic of the computing device 102, via a wired or wireless data connection. In certain embodiments, the computing device may be configured by installation of a content sharing program that is compatible with the imaging device 114. The content sharing program, in turn, may be configured to implement the further functionality described below.

Although FIG. 1 shows a particular mounting arrangement of the imaging device 114, many other imaging configurations may also be used. In some embodiments, the imaging device 114 may be separate from the display surface 110 and computing device 102. For instance, the imaging device 114 may be mounted on a wall of a room or attached to a piece of furniture, in a position that allows viewing of the display surface 110 by the imaging device 114. Again, the imaging device 114 may communicate with the computing device 102 via a wired or wireless connection.

Furthermore, the display surface 110 may comprise surfaces other than dedicated computer monitors and displays. For example, the display surface may be formed by a portion of a wall upon which content is projected, or by other available types of display technologies.

The computing device 102 is configured by the content sharing program to display shared content 120 on the local display surface 110. The shared content 120 may comprise text, documents, graphics, pictures, video, or combinations of the foregoing, which are displayed concurrently on the display surfaces associated with various different users. The installed content sharing program may provide for various types of collaborative interaction with the shared content 120, such as moving graphical pointers, selecting displayed objects, highlighting, editing, and other manipulations. On-screen manipulations and operations performed by one user with respect to the displayed content may be visible to other users on their respective display surfaces in real time. The content sharing program may also implement or facilitate audio and/or video conferencing among the users.

The computing device 102 may be further configured to detect placement of the local user's hand 116 over the display surface 110, to determine the position of the user's hand 116 relative to the display surface 110 and/or the shared content 120, and to detect other characteristics of the user's hand such as characteristics relating to shape and/or color of the user hand. Position may include vertical and horizontal positions of the hand, orientation or rotation of the hand, and/or depth coordinates of the hand or points of the hand with respect to the imaging device 114 and/or the display surface 110. Hand shape may include relative positions and orientations of the back of the hand and the fingers of the hand, which may be combined to represent hand gestures. Color characteristics may include skin tones, features, textures, and so forth.

The local computing device 102 may be configured to send certain detected characteristics of the hand to the remote computing device 104, for use by the remote computing device 104 in creating and displaying a virtual hand 122 in conjunction with the shared content 120. The detected characteristics may include information at various levels of detail and/or realism, depending on the particular embodiment. For instance, the local computing device 102 may provide basic positional information of the user hand 116, without providing color information. The basic positional information may include only the position of the user hand 116, or may include both position and orientation of the user hand 116. In some embodiments, the positional information may also include the shape of the user hand 116 or certain shape information regarding the user hand 116. In certain embodiments, hand characteristics may be parameterized to indicate things such as color, texture, position, orientation. In addition, parameterized hand characteristics may include a two-dimensional or three-dimensional model of a hand, indicating the relative positions and orientations of the fingers of the hand.

In some implementations, the detected characteristics of the user hand 116 may include average color or assumed color of the user hand 116. In other implementations, a two-dimensional greyscale image or color image of the user hand 116 may be provided as part of the detected hand characteristics. In some embodiments, both three-dimensional information and two-dimensional color information may be indicated by the detected characteristics provided to the second computing device 104.

The remote computing device 104 may be configured by way of an installed content sharing program to receive the hand characteristics from the first computing device 102, and to generate the virtual hand 122 based on the received hand characteristics. The virtual hand 122 is superimposed by the second computing device 104 on or over the shared content 120, at the position of the actual hand 116 of the first user 106 relative to the shared content.

The virtual hand 122 may be a graphical or figurative representation of a hand, and may exhibit a level of detail and/or realism that depends on the information received from the first computing device 102. In some cases, the virtual hand 122 may comprise a simple outline or other basic representation of a hand and the virtual hand 122 may have a fixed or assumed orientation. In other cases, the virtual hand 122 may include skin colors and textures of the first user's hand 116, and may be dynamically oriented and positioned based on the information received from the first computing device 102. In some embodiments, the virtual hand 122 may be a photographic likeness of the actual user hand 116 based on photographic information of the user hand 116 received from the first computing device 102.

When using the techniques described above, a collaborating user such as the first user 106 may point to portions or parts of the displayed content 120 with their hand. Remote users who are viewing the same content will see the user's hand superimposed over the shared content, which may greatly improve the effectiveness of collaboration. This type of shared hand visibility may be used in conjunction with other available forms of collaboration, such as telephone or audio conferencing, video-conferencing, shared on-screen manipulations, and so forth.

The shared content 120 and characteristics of the user's hand 116 may be communicated between the computing devices 102 and 104 over a wide-area network (WAN) 124 or other communications channel. In many implementations, the WAN 124 may comprise a public network such as the Internet.

The shared content 120 may originate or be generated from one of the computing devices 102 or 104. Alternatively, the shared content may originate from another source, such as a server or other network-based resource.

Figure 2:
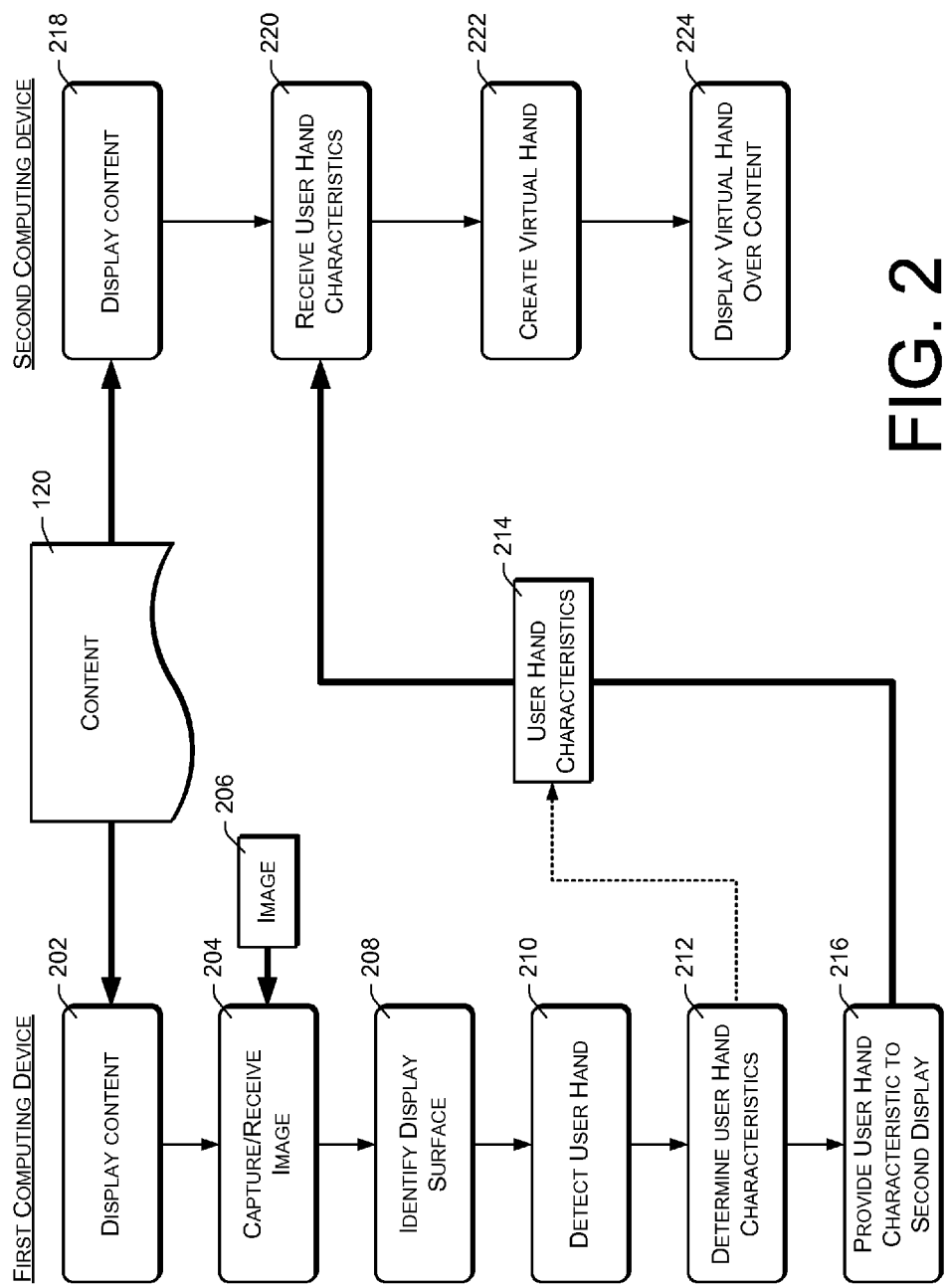
FIG. 2 is a flowchart illustrating an example method of collaboration with regard to shared content.

FIG. 2 illustrates techniques for collaborating among users by detecting and reproducing placement of a user's hand over shared content. The techniques are described with reference to the environment of FIG. 1, although the described techniques may be used in other environments and situations. Actions shown on the left side of FIG. 2 are performed at or by the first computing device 102. Actions shown on the right side are performed at or by the second computing device 104. However, it should be noted that each of the collaborating computers may be configured to perform the actions on both sides of FIG. 2. That is, a particular computer may provide detected hand characteristics to other computers, and may also receive hand characteristics of other users from other computers, and may display a virtual hand over the shared content based on the positions of remote users' hands. Furthermore, although the techniques of FIG. 2 are described with reference to a pair of computing devices in which a user hand is detected at a first computer and displayed as a virtual hand on a second computer, the described techniques are more generally applicable to any number of computing devices or collaboration devices, in which any or all of the computing devices may have the capabilities described above for both capturing and providing user hand characteristics and for displaying a virtual hand based on received user hand characteristics.

In addition, although the techniques are described with reference to a user hand, the techniques are also applicable to more general situations in which a physical object may be placed over displayed and shared content. Such a physical object may comprise an article other than a hand, or may comprise a hand and/or an article held by the hand.

An action 202, performed by the first computing device 102, comprises displaying the shared content 120 on the display surface 110 of the first or local computing device 102. In practice, the shared content 120 may originate from either the first computing device 102, the second computing device 104, or from another source. The content may be displayed within a portion of the local display surface 110, or may occupy the entire local display surface 110.

An action 204 comprises capturing and/or receiving an image 206 using the imaging device 114. As discussed above, the image represents an area or region that includes the first display surface 110 of the first computing device 102. The image 206 may include two-dimensional color or greyscale information, three-dimensional depth information, or both.

An action 208 comprises identifying the coordinates of the local display surface 110 within the image 206. This may be performed in various ways, such as by edge detection, feature detection, etc. In certain embodiments, the user 106 may be asked as part of an initialization procedure to view a sample image 206 and to manually specify corners of the display surface 110 within the sample image 206. in other embodiments, the display surface 110 may be programmatically detected within the image 206 by analyzing areas of brightness, by detecting edges that form a rectangle, or by other image processing techniques. Three-dimensional analyses may be performed in some embodiments to identify planar surfaces within the image that may correspond to the display surface 110. Such three-dimensional analyses may be followed by color or shade analyses to detect coordinates of the display surface 110.

An action 210 comprises detecting the presence of the user hand 116 that is positioned over the local display surface 110. Hand detection may be performed in various ways, such as by analyzing for skin tones, or by analyzing three-dimensional information to detect hand shapes. In some embodiments, three-dimensional information may be analyzed with reference to a previously identified planar display surface to detect any objects that are between the imaging device 114 and the display surface 110, and such objects may be deemed to represent a user hand.

An action 212 comprises determining user hand characteristics 214, based on the detection of the user hand in the action 210 and on the image 206. As discussed above, the user hand characteristics 214 may include the position of the user hand 116 as well as color and shape characteristics. In certain embodiments, the user hand characteristics 214 may comprise the position and orientation of the user hand 116, which is referred to as the pose of the hand. The user hand characteristics 214 may also include the shape or gesture that is formed by the hand, including relative orientations of the fingers of the user hand 116. Color characteristics may include texture, tone, color or greyscale, shading, and so forth. The hand characteristics 214 may further include position, color, and shape characteristics of objects that are held by the hand, such a pen or other object that may be used for pointing. In some embodiments, the user hand characteristics 214 may include a photographic image of the hand or portions of the hand. In other embodiments, the user hand characteristics 214 may be represented parametrically.

An action 216 comprises providing or sending the user hand characteristics 214 to the remote computing device 104.

Actions performed by the second computing device 104 include an action 218, which comprises displaying the shared content 120 on the display surface 112 of the second computing device 104. This action, as well as the following actions, may be implemented by a content sharing program installed on the second computing device 104.

An action 220 comprises receiving the user hand characteristics 214 from the first computing device 102.

An action 222 comprises creating the virtual hand 122 based at least in part on the user hand characteristics 214. The virtual hand 122 may comprise a two-dimensional, figurative or graphical likeness of a hand, in varying levels or detail and realism depending on the embodiment, as described above.

An action 224 comprises displaying or superimposing the virtual hand 122 over the shared content 120 that is displayed by the second computing device 104. The virtual hand 122 may be displayed at a position, relative to the shared content, of the user hand 116 as indicated by the user hand characteristics 214. In certain embodiments, the virtual hand 122 may also be oriented as indicated by the user hand characteristics 214. In certain embodiments, the virtual hand may have a shape or exhibit a gesture as indicated by the user hand characteristics 214.

The virtual hand 122 may also have colors and/or textures as indicated by the user hand characteristics 214. The virtual hand 122 may be represented as an outline or monochromatic image, or as a shaded and textured image that more closely represents the user hand 116. In some cases, where the user hand characteristics include photographic or photographic-like information, the virtual hand 122 may comprise a photographic or near-photographic representation of the user hand 116.

The actions described with reference to FIG. 2 may be performed concurrently and repetitively, so that the shared content is updated continuously and so that the position, orientation, movement, and representation of the user hand 116 is continuously and dynamically represented by the virtual hand 122 that is shown on the second computing device 104.

Figure 3:
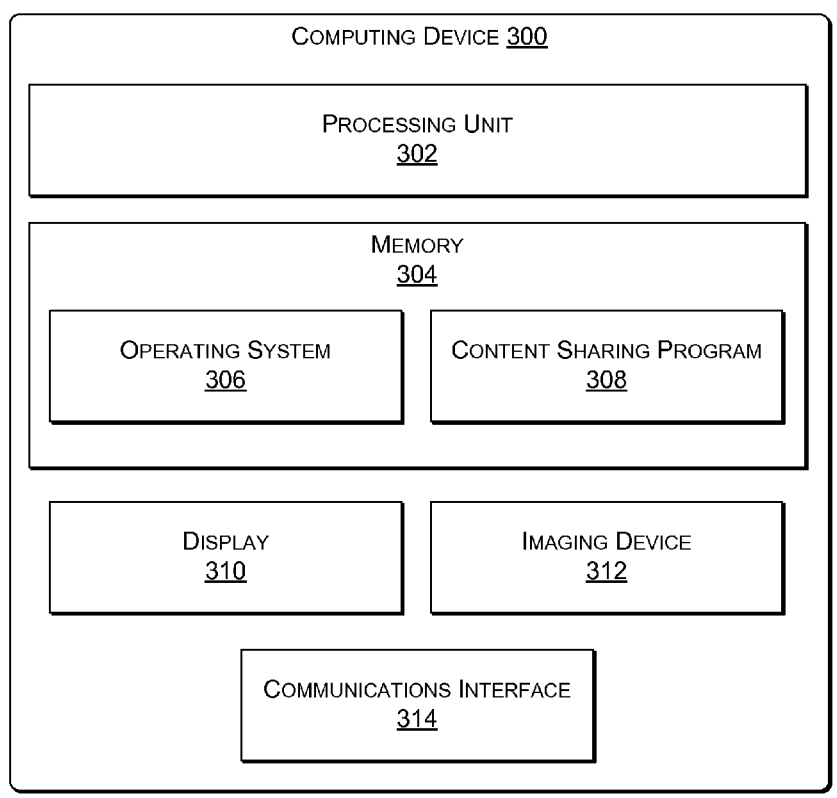
FIG. 3 is a block diagram of an example computer that may be used in conjunction with the techniques described herein.

FIG. 3 illustrates relevant components of a computing device 300 that may be used to implement the functionality described above, and in particular to implement the computing devices 102 and 104. In a very basic configuration, an example computing device 300 might comprise a processing unit 302 composed one of one or more processors, and memory 304. The memory 304 may comprise computer storage media and may include volatile and nonvolatile memory. Thus, the memory 304 may include, but is not limited to, RAM, ROM, EEPROM, flash memory, or other memory technology, or any other medium which can be used to store media items or applications and data which can be accessed by the computing device 300.

The techniques described above are assumed in the given examples to be implemented in the general context of computer-executable instructions or software, such as program modules, that are stored in the memory 304 and executed by the processing unit 302. Generally, program modules include routines, programs, objects, components, data structures, etc., and define operating logic for performing particular tasks or implement particular abstract data types.

Thus, the memory 304 may store an operating system 306 as well components, modules, and/or logic for performing the actions described above. For example, the memory 304 may contain a content sharing program 308, which may be configured to perform or implement the functionality described above with respect to the first computing device 102, the second computing device 104, or both.

The computing device may have a display 310, which may include the display surface 110 or 112 shown in FIG. 1. The computing device 300 may also have one or more imaging devices 312, which may provide the functionality of the imaging device 114 of FIG. 1.

The computing device 300 may also have a communications interface 314, such as a wired or wireless network interface, for communicating with other computing devices.

For example, the communications interface 314 may comprise an Ethernet adapter for communications over common communications networks.

The computing device 300 may of course include many other logical, programmatic, and physical components, of which those shown in FIG. 3 are merely examples that are related to the discussion herein. Thus, the computing device 300 may include various other communications interfaces, storage devices, input/output components, and so forth.

Although the discussion above sets forth an example implementation of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances. In some embodiments, all or parts of the functionality described above may be provided by or supported by network-accessible servers or services.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device, comprising:
   a processor;
   an imaging device;
   memory, accessible by the processor and storing instructions that are executable by the processor to perform acts comprising:
   displaying content on a first display surface associated with a first user, wherein the content is displayed concurrently on one or more other display surfaces that are associated respectively with one or more other users;
   receiving an image from the imaging device of an area that includes the first display surface, including the content displayed on the first display surface, and a first user hand positioned over at least a portion of the first display surface;
   detecting one or more edges of the first display in the image received from the imaging device;
   identifying coordinates of the first display surface based at least in part on the one or more edges;
   determining a position of the first user hand relative to the first display surface, based at least in part on the coordinates;
   determining the position of the first user hand relative to the content;
   determining one or more first characteristics representative of the first user hand based at least in part on the image;
   sending the one or more first characteristics representative of the first user hand for use in displaying a first virtual hand in conjunction with the content on the one or more other display surfaces;
   receiving information indicating one or more second characteristics representative of a second user hand that is positioned over one of the one or more other display surfaces; and
   displaying a second virtual hand representative of the second user hand in conjunction with the content on the first display surface, wherein the second virtual hand includes the one or more second characteristics representative of the second user hand.

2. The computing device of claim 1, wherein displaying the second virtual hand comprises superimposing the second virtual hand on the content.

3. The computing device of claim 1, wherein the second virtual hand comprises a photographic representation of the second user hand.

4. The computing device of claim 1, wherein the image comprises one or more of:
   a depth map;
   a two-dimensional greyscale image; or
   a two-dimensional color image.

5. The computing device of claim 1, wherein the one or more first characteristics of the first and second user hands comprise one or more visual characteristics of the first and second user hands and detected positions of the first and second user hands relative to the content.

6. The computing device of claim 1, wherein the one or more first characteristics including at least one skin tone.

7. A method, comprising:
   causing display of visual content on first user display surface during a first period of time, the first user display surface associated with a first user;
   causing display of the visual content on a second user display surface during the first period of time, the second user display surface associated with a second user;
   receiving an image of an area that includes the first user display surface and a first user hand;
   detecting one or more edges of the first user display surface in the image;
   identifying coordinates of the first user display surface based at least in part on the one or more edges;
   detecting that the first user hand is positioned over the first user display surface, based at least in part on the coordinates;
   determining that the first user hand is positioned over at least a portion of the visible content displayed on the first user display surface, based at least in part on the coordinates;
   determining one or more characteristics representative of a skin tone associated with the first user hand based at least in part on the image, wherein the one or more characteristics include a position of the first user hand relative to the visual content displayed on the first user display surface; and
   displaying a virtual hand representative of the first user hand on the second user display surface at the position representative of the first user hand relative to the visual content.

8. The method of claim 7, wherein displaying the virtual hand comprises superimposing the virtual hand on the visual content on the second user display surface.

9. The method of claim 7, wherein displaying the virtual hand comprises displaying a photographic representation of the user hand on the second user display surface.

10. The method of claim 7, wherein the image comprises one or more of:
   a depth map;
   a two-dimensional greyscale image; or
   a two-dimensional color image.

11. The method of claim 7, wherein the one or more characteristics comprise one or more of the following:
   one or more visual characteristics; or
   one or more color characteristics.

12. The method of claim 11, wherein the one or more visual characteristics comprise one or more shape characteristics.

13. A method comprising:
   receiving content that is to be concurrently displayed on a first user display surface and a second user display surfaces that are associated respectively with different users;
   displaying the content on the first user display surface;
   receiving an image of a region that includes the first user display surface and a physical object that is positioned over the first user display surface;
   detecting one or more edges of the first user display surface in the image;
   identifying coordinates of the first user display surface based at least in part on the one or more edges;
   determining that the physical object is positioned over at least a portion of the content, based at least in part on the coordinates;
   determining one or more characteristics representative of at least one texture of the physical object that is positioned over the first user display surface based, at least in part, on the image; and
   providing the one or more characteristics representative of the at least one texture of the physical object for use in displaying a virtual object representative of the physical object in conjunction with the concurrently displayed content on the second user display surface.

14. The method of claim 13, wherein the one or more characteristics of the physical object comprise a position of the physical object relative to the concurrently displayed content.

15. The method of claim 13, wherein the physical object comprises one or more of the following:
   a user hand; or
   an article held by the user hand.

16. The method of claim 13, further comprising determining that the physical object is a user hand and determining a position of the hand relative to the first user display surface.

17. The method of claim 16, wherein the image comprises an optical image that indicates color information regarding the physical object.

18. The method of claim 16, wherein the image comprises a depth map that indicates three-dimensional information regarding the physical object.

19. A method comprising:
   receiving content that is to be displayed concurrently on a first user display surface and a second user display surface, the first user display surface associated with a first location and the second user display surface associated with a second location;
   displaying the content on the first user display surface;
   detecting one or more features in the content displayed on the first user display surface;
   identifying coordinates of the first user display surface based at least in part on the one or more features;
   displaying the content on the second user display surface;
   receiving information indicating one or more physical characteristics representative of a physical object positioned over the first display surface, wherein the physical object is detected based at least in part on the coordinates, wherein the physical object comprises one or more of a user hand or an article held by the user hand; and
   displaying a virtual object representative of the physical object on the second user display surface, wherein the virtual object has the one or more characteristics representative of the physical object.

20. The method of claim 19, wherein displaying the virtual object comprises superimposing the virtual object on the concurrently displayed content on the second user display surface.

21. The method of claim 19, wherein:
   the one or more characteristics indicate a position of the physical object relative to the displayed content; and
   displaying the virtual object comprises displaying the virtual object at the indicated representative position relative to the concurrently displayed content.

22. The method of claim 19, wherein the one or more characteristics comprise an image of the physical object, the acts further comprising creating the virtual object based at least in part on the image of the physical object.

23. The method of claim 19, wherein the one or more characteristics comprise one or more shape characteristics of the physical object, the acts further comprising creating the virtual object based at least in part on the shape characteristics of the physical object.

* * * * *